United States Patent [19]

Maxwell

[11] Patent Number: 4,603,869
[45] Date of Patent: Aug. 5, 1986

[54] HELICOPTER GROUND HANDLING WHEEL ASSEMBLY

[76] Inventor: Eugene O. Maxwell, 120 Coin, Fort Worth, Tex. 76140

[21] Appl. No.: 670,567

[22] Filed: Nov. 13, 1984

[51] Int. Cl.$^4$ ............................................. B64F 1/04
[52] U.S. Cl. .................................... 280/11; 244/17.17
[58] Field of Search ............... 244/17.17, 50; 211/192; 280/11, 9, 8

[56] References Cited

U.S. PATENT DOCUMENTS

| | | | |
|---|---|---|---|
| 1,134,657 | 4/1915 | Wisted | 280/11 |
| 1,280,845 | 10/1918 | Rieff | 280/11 |
| 2,926,021 | 2/1960 | Altadonna | 280/11 |
| 3,279,722 | 10/1966 | Glover, Jr. et al. | 244/50 |
| 4,094,485 | 6/1978 | O'Callaghan | 211/192 X |

Primary Examiner—John J. Love
Assistant Examiner—Michael Mar
Attorney, Agent, or Firm—James E. Bradley

[57] ABSTRACT

A ground handling wheel assembly for coupling to a skid of a helicopter enables the helicopter to be moved on the ground. The wheel assembly has a main shaft, which has on each end a wheel shaft offset from and parallel with the main shaft. Wheels are rotatably mounted to each wheel shaft. A breakover bar locates within a hole in the wheel assembly to rotate the main shaft, and thereby the wheel shafts in a circular path, lifting the skid from the ground.

3 Claims, 9 Drawing Figures

HELICOPTER GROUND HANDLING WHEEL ASSEMBLY

BACKGROUND OF THE INVENTION

1. Field of the Invention

This invention relates in general to portable wheel assemblies, and in particular to a wheel assembly for coupling to a skid of a helicopter for moving the helicopter on the ground.

2. Description of the Prior Art

Various wheel assemblies have been made in the past for coupling to the skids of the helicopter to move the helicopter on the ground for maintenance. Generally, the prior art wheel assemblies are not reliable and are more complicated than desired. Many employ a hydraulic jack in conjunction with a dual wheel assembly.

Another disadvantage of the prior art wheel assemblies occurs if the helicopter is being towed or moved over an inclined surface. At times, only one of the wheels will be in contact with the ground, placing a great strain on the supporting wheel. The possibility of a blowout, resulting in damage to the helicopter exists.

SUMMARY OF THE INVENTION

The wheel assembly of this invention also uses dual wheels. The shaft or axle connecting the two wheels has a central or main portion that is offset from the side or wheel portions of the shaft. The central and the wheel portions are rigidly coupled together by rotation blocks, resulting in a generally U-shaped configuration for the shaft means. The rotation blocks enable a breakover bar to be placed into a receptacle to rotate the wheel shafts from an upper position to a lower position, lifting the skid and supporting the helicopter. A pin will secure the central shaft against rotation when in the lower position and in the upper position.

The shaft means is mounted to the skid by means of a cradle. The connection between the shaft support and the cradle is pivotal, assuring that both wheels will contact the ground wven on inclined surfaces. An overcenter cam is used to positively lock the cradle to the skid. The particular overcenter point can be adjusted by a rotatable knob located on an arm that rotates the cam. The variable point at which the cam stops accommodates skid diameter variations.

DESCRIPTION OF THE PREFERRED EMBODIMENT

Figure 1:
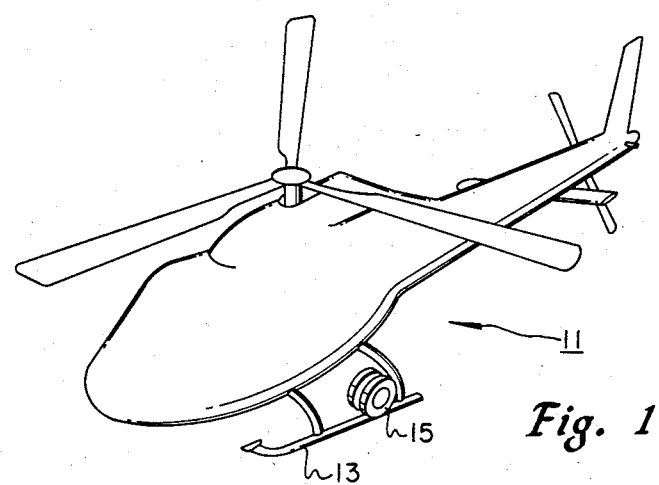
FIG. 1 is a schematic view of a helicopter having a wheel assembly in accordance with this invention.

Referring to FIG. 1, helicopter 11 has two skids 13 (only one shown). A ground handling wheel assembly 15 is shown mounted to one of the skids 13, and shown in an upper, non-supporting position.

Figure 2:
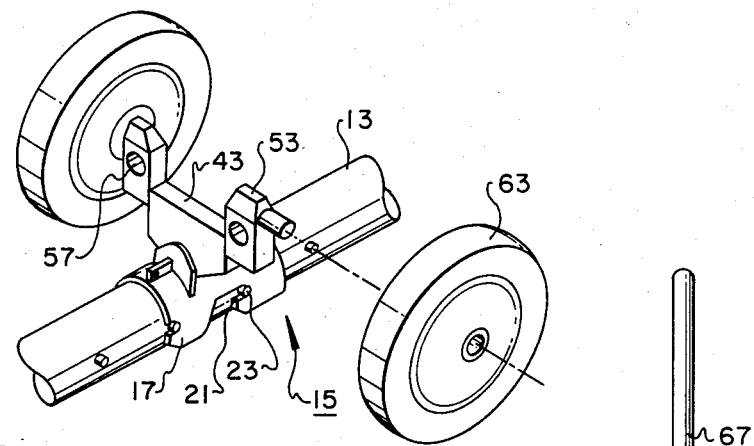
FIG. 2 is an enlarged perspective view of the wheel assembly of FIG. 1, with the wheels shown in the upper position, and with one of the wheels removed.
Figure 5:
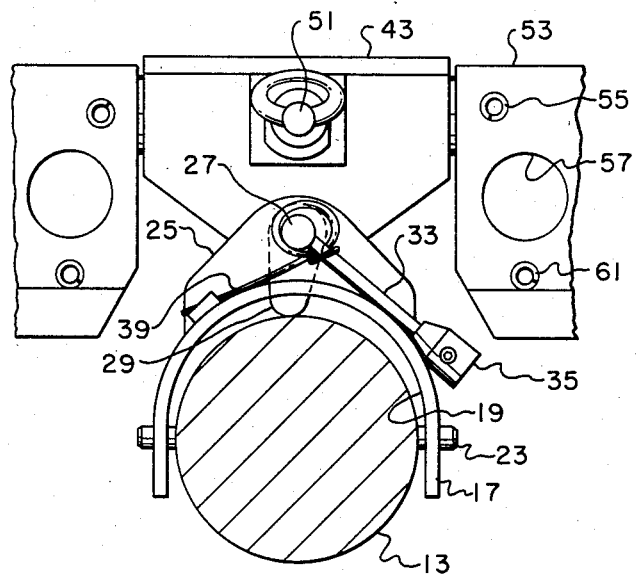
FIG. 5 is an enlarged partial front view of the wheel assembly of FIG. 1, shown enlarged.
Figure 9:
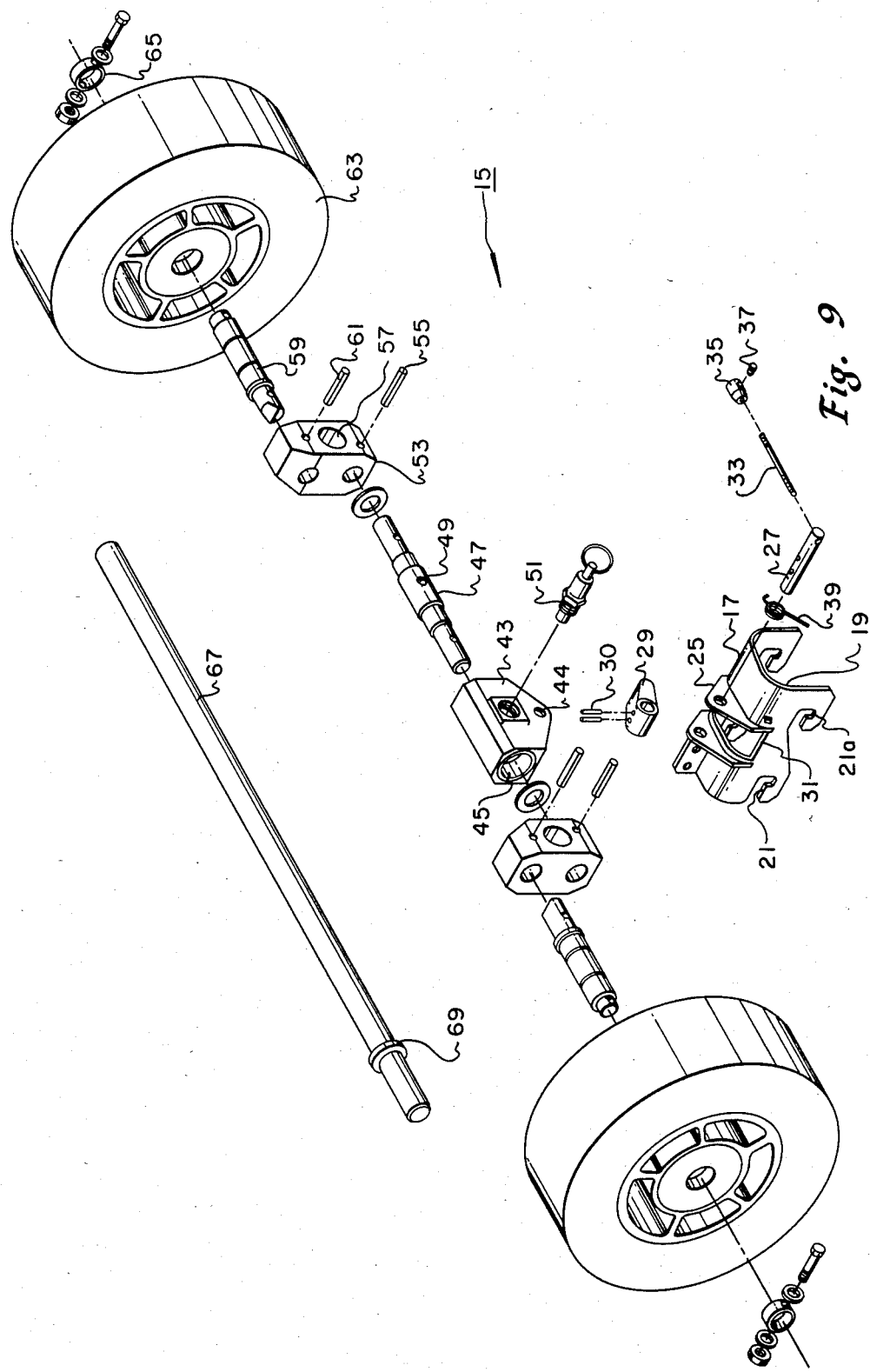
FIG. 9 is a perspective view of the wheel assembly of FIG. 2, shown exploded.

Referring to FIGS. 2, 5 and 9, the wheel assembly 15 has a mounting means for releasably coupling the wheel assembly to the skid 13. The mounting means includes a cradle 17, which consists of a U-shaped member, having a downwardly facing channel 19. Two slots 21 are formed in the depending sides of the channel 17. Each slot 21 has a locking portion 21a, defining a general "J" shape for each slot 21. The slots 21 are adapted to receive locking pins 23 (FIG. 2) that protrude outwardly from the sides of the skid 13.

Figure 6:
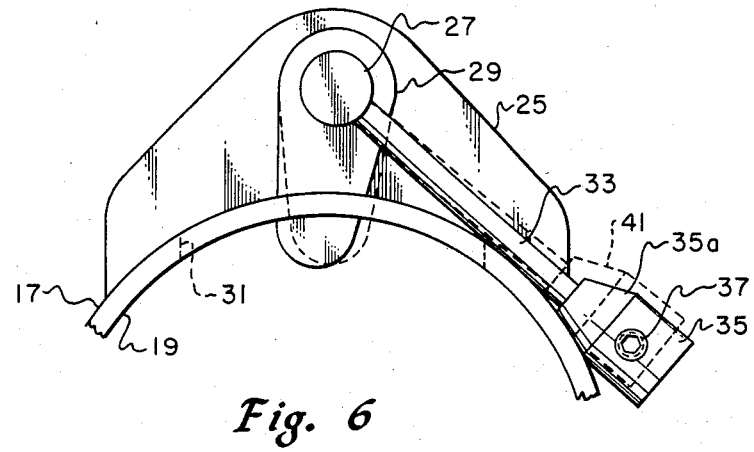
FIG. 6 is a further enlarged partial front view of the wheel assembly of FIG. 1.

A pair of brackets 25 are mounted to the top of the cradle 17. A pivot pin 27 extends through the brackets, parallel with the axis of the channel 19 and with the axis of the skid 13. A cam 29 is rigidly mounted to pivot pin 27 by means of a pair of roll pins 30. Cam 29 extends downwardly through an aperture 31 for contacting the top of the skid 13. An arm 33 is mounted to the end of pin 27 and extends laterally outward for rotating the pin 27. Arm 33 has a knob 35 mounted to its end by threads. A set screw 37 enables the knob to be placed along the arm 33 at different positions. As shown in FIG. 6, the knob 35 has a frusto-conical inner portion 35a that contacts the outer surface of the cradle 17 to stop movement of the cam 29 in the clockwise direction, as shown in FIG. 6. Knob 35 is positioned so that cam 29 will extend slightly past the 180 degree or dead center position, which would be on a vertical line extending downwardly from the axis of pivot pin 27. Rotating the cam 29 clockwise pushes on skid 13 and moves the cradles 17 upwardly with respect to the skid 13. This movement pulls the pins 23 tightly into the slot locking portions 21a (FIG. 9). The overcenter stop position prevents the cam 29 from accidentally moving counterclockwise, which might release the cradle 17. A spring 39 biases the arm 33 downwardly, and biases the cam 29 to the overcenter stop position.

The dotted lines 41 illustrate how the repositioning of knob 35 can change the particular overcenter stop position. The dotted lines 41 show the knob 35 moved closer toward the pivot pin 27 than the solid lines. The frusto-conical surface 35a results in the arm 33 being located farther from the top of the cradle 17, than when the knob 35 is in the more extended position shown by the solid lines. Positioning of the arm 33 farther from the cradle 17 in the overcenter position results in the cam 29 stopping at a point that is not quite so far, rotationally, as previously. The position would still be slightly past 180 degrees from the top.

Referring again to FIG. 9, a main shaft support 43 is pivotally mounted to the top of the cradle 17. Main shaft support 43 has a passage 44 which rotatably receives the pivot pin 27. Main shaft support 43 also has a passage 45 which is perpedicular to the pivot pin 27 for receiving a main shaft 47. Main shaft 47 will rotate within passage 45, but it also can be locked against any rotation with respect to the shaft support 43. A spring loaded locking pin 51 extends into a hole 49 in shaft 47 to selectively lock the shaft 47 to the shaft support 43. Hole 49 appears on opposite sides of the main shaft 47, enabling the pin 51 to lock the shaft in two positions, each 180 degrees apart from the other.

A rotation block 53 is secured to each end of the main shaft 47 by means of roll pins 55. Rotation blocks 53 thus are rigidly coupled to the main shaft 47 for rotation therewith. Each rotation block 53 has a hole or receptacle 57 extending perpendicular to the axis of the main shaft 47. A wheel shaft 59 is secured to each rotation block 53, and extends laterally outward. Each wheel shaft 59 is located at an end of each rotation block 53 opposite from the connection to the main shaft 47. This causes the axis of each wheel shaft 59 to be offset from, but parallel with the axis of the main shaft 47. Roll pins 61 secure each wheel shaft 59 to each rotation block 53 for rotation therewith. Consequently, any rotation of the main shaft 47 will result in rotation of the wheel shafts 59 in a circular path (not shown), about the axis of main shaft 47. The radius of the path will be the distance between the axis of the main shaft 47 and each wheel shaft 59.

A wheel 63 is rotatably mounted to each wheel shaft 59 by means of a retainer ring assembly 65. A breakover bar 67 is adapted to fit within each hole 57, with a ring stop 69 limiting the movement through the hole 57.

In operation, to use the wheel assembly 15, it is first mounted to a skid 13. As shown in FIG. 2, the wheels 63 will be locked into the upper position while the wheel assembly 15 is being coupled to the skid 13. The wheels 63 are maintained in the upper position by means of pin 51 seating in hole 49 in main shaft 47 (FIG. 9). The cam 29 is rotated counterclockwise, when viewed in FIG. 6, and the cradle 17 is placed over the pins 23 (FIG. 2). Then the arm 33 is rotated downwardly to move the cam 29 into a wedging position against the top of the skid 13. In the wedging position, the pins 23 will be bearing against the locking portions 21a of the slots 21. If the cam 29 does not wedge tightly, its overcenter position can be changed by loosening set screw 37 and moving knob 35 to another position along the arm 33. Changing the overcenter position will accommodate slight variations in diameter of the skid 13.

Figure 3:
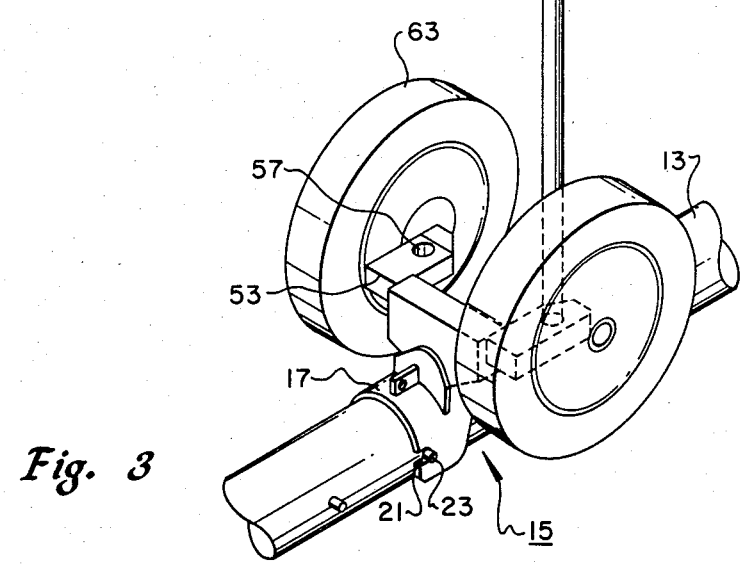
FIG. 3 is a perspective view of the wheel assembly of FIG. 2, showing the wheels being moved from the upper position toward the lower position.
Figure 4:
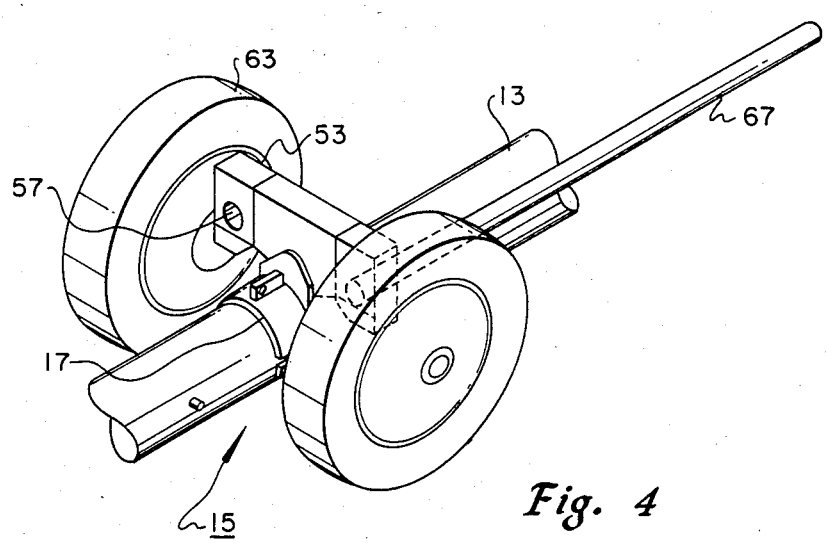
FIG. 4 is a perspective view of the wheel assembly of FIG. 2, showing the wheel assembly in the lower, skid supporting position.
Figure 8:
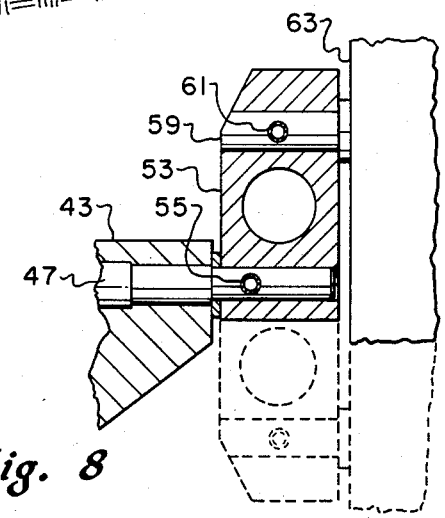
FIG. 8 is a sectional view of a portion of the wheel assembly of FIG. 2, shownning the wheel in the upper position.

After the cradle 17 is tightly locked to the skid 13, the locking pin 51 is pulled from the hole 49, enabling the shaft 47 to rotate. As shaft 47 rotates, the wheel shafts 59 and the wheels 63 will rotate in a circular path downward until the wheels 63 contact the ground. The breakover bar 67 is inserted into one of the holes 57. The breakover bar is rotated, as shown in FIGS. 3 and 4, moving the wheel shaft 59 to a position below the main shaft 47. FIG. 8 illustrates in solid lines the wheel shafts 59 in the upper storage position, and in dotted lines the wheel shaft 59 in the lower skid supporting position. In the lower position, the skid 13 will be picked up by the wheel assembly 15 and supported by the wheels 63. Once the lower position is reached, the spring-loaded pin 51 snaps into the hole 49, locking the main shaft 47 against rotation. This secures the wheel assembly 15 in the skid supporting position.

Figure 7:
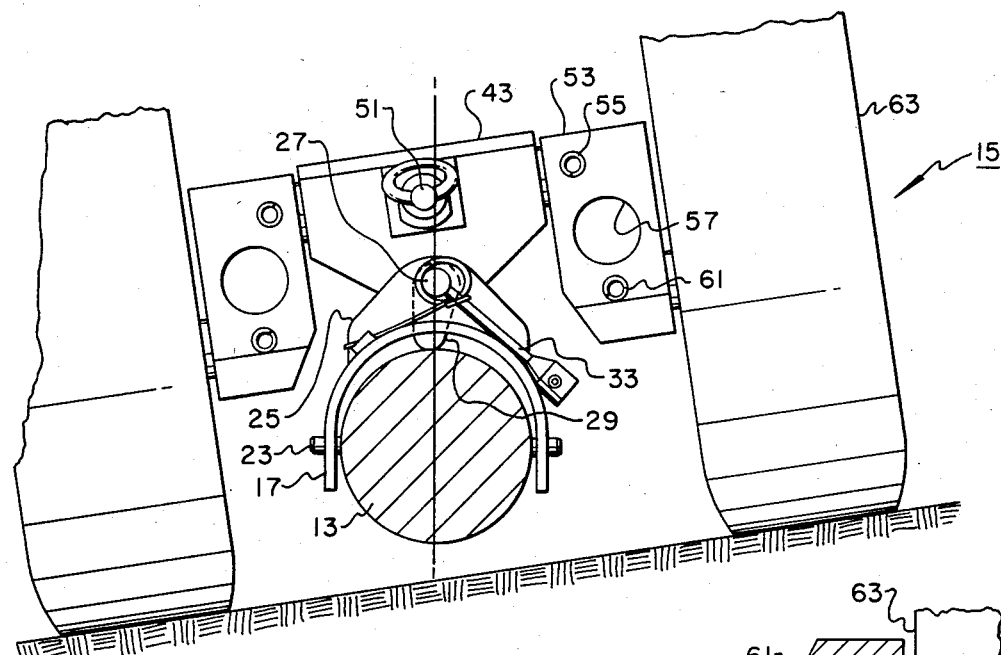
FIG. 7 is a front view of the wheel assembly of FIG. 2, shown supporting the skid on an inclined surface.

If the wheels 63 are rolled over an inclined surface, as shown in FIG. 7, the freely rotatable connection of the pivot pin 27 with the shaft support 43, enables the cradle 17 to remain vertical while the shafts 47 and 59 incline parallel with the inclined ground surface. This avoids having one of the wheels 63 of the wheel assembly 15 being suspended in the air, while the other contacts a portion of an inclined surface.

The invention has significant advantages. The wheel assembly is simple in construction. The wheel assembly is easily installed and moved from the upper to the lower position. The wheel assembly will accommodate variations in skid diameter. The wheels of the wheel assembly will maintain contact with an inclined ground surface.

While the invention has been shown in only one of its forms, it should be apparent to those skilled in the art that it is not so limited but is susceptible to various changes without departing from the scope of the invention.

I claim:

1. In a ground handling wheel assembly for coupling to a skid of a helicopter, each of the skids having locking pins protruding laterally outward from opposite sides, an improved means for securing the wheel assembly to the skid, comprising in combination:

a cradle having a downwardly facing channel for reception over the skid and having a slot on each side for receiving one of the locking pins;

a pivot pin extending across the top of the cradle parallel with the axis of the channel;

a cam mounted to the pivot pin for rotation therewith, and extending through an aperture in the top of the cradle for engaging the top of the skid;

an arm coupled to the pivot pin and extending laterally outward for selectively rotating the pivot pin and thereby the cam to an overcenter stop position wedging against the top of the skid; and a knob coupled to the arm, the knob having a stop surface that contacts the cradle to locate the cam in the desired overcenter stop position, the knob being positionable along the length of the arm to selected positions, each of which varies the angle of the arm with respect to the cradle when the stop surface engages the cradle, thereby varying the desired overcenter position to accommodate variations in skid diameters.

2. The wheel assembly according to claim 1, further comprising:

spring means coupled to the pivot pin for urging the cam to the overcenter position.

3. A ground handling wheel assembly for coupling to a skid of a helicopter, the skid having at least one locking pin protruding laterally outward from opposite sides of each skid, the assembly comprising in combination:

a cradle having a downwardly facing channel for reception over the skid and having slots on each side for receiving the locking pins;

a pivot pin extending across the top of the cradle parallel with the axis of the channel;

a cam mounted to the pivot pin for rotation therewith, and extending through an aperture in the top of the cradle for engaging the top of the skid;

an arm coupled to the pivot pin and extending laterally outward for selectively rotating the pivot pin and thereby the cam to an overcenter stop position wedging against the top of the skid;

a main shaft support mounted to the top of the cradle by the pivot pin, enabling pivotal movement of the cradle with respect to the main shaft support;

a main shaft rotatably carried in the main shaft support perpendicular to the axis of the skid;

a wheel shaft rigidly carried by each end of the main shaft parallel to and offset from the axis of the main shaft;

a wheel rotatably mounted to each wheel shaft;

receptacle means in the wheel assembly for receiving a bar to rotate the main shaft, and thereby the wheel shafts and wheels in a circular path about the axis of the main shaft to a skid supporting position with the wheel shafts lower than the main shaft and supporting the skid above the ground for moving the helicopter on the wheels.

* * * * *